United States Patent [19]

Graindorge et al.

[11] Patent Number: 4,542,955

[45] Date of Patent: Sep. 24, 1985

[54] DEVICE FOR ILLUMINATING AN ELECTRO-OPTICAL MEDIUM FOR RECORDING HOLOGRAMS IN REAL TIME

[75] Inventors: Philippe Graindorge; Hervé Arditty, both of Paris, France

[73] Assignee: Thomson-CSF, Paris, France

[21] Appl. No.: 504,733

[22] Filed: Jun. 16, 1983

[30] Foreign Application Priority Data

Jun. 18, 1982 [FR] France ............................ 82 10703

[51] Int. Cl.$^4$ .................. G01B 9/027; G02F 1/29; G03H 1/00
[52] U.S. Cl. ................................. 350/3.63; 350/355; 350/3.64; 356/347
[58] Field of Search ................ 350/3.62, 3.63, 3.64, 350/354, 355, 356; 356/347, 354, 348

[56] References Cited

U.S. PATENT DOCUMENTS 4,304,458 12/1981 Huignard et al. ............... 350/3.63
4,442,455 4/1984 Huignard et al. ............... 350/3.63

*Primary Examiner*—John K. Corbin
*Assistant Examiner*—Bruce S. Shapiro
*Attorney, Agent, or Firm*—Oblon, Fisher, Spivak, McClelland & Maier

[57] ABSTRACT

The invention relates to electro-optical media which make it possible to record holograms in real time. It consists in using a lamina of a selected material such as bismuth-silicon oxide, this lamina being subjected to a transverse electric field perpendicular to the fringes of the hologram to be inscribed, and in illuminating this lamina with a light beam which is not coherent with the two object and reference beams which interfere within this lamina.

9 Claims, 5 Drawing Figures

DEVICE FOR ILLUMINATING AN ELECTRO-OPTICAL MEDIUM FOR RECORDING HOLOGRAMS IN REAL TIME

BACKGROUND OF THE INVENTION

The present invention relates to holographic recording cells which make it possible to record holograms in a reversible manner in an electro-optical sensitive medium.

Recording of a hologram in a material such as lithium niobate ($LiNbO_3$) is already known. The principal disadvantage of this material, and of similar materials, used to date, is their low sensitivity compared, for example, to those of photographic emulsions used for the same purpose.

It is also known that images can be recorded in electro-optical and photo-conducting materials such as bismuth-silicon oxide $Bi_{12}SiO_{20}$ and bismuth-germanium oxide $B_{12}GeO_{20}$ by applying a longitudinal electric field perpendicularly to a sheet of such material. This field is generally obtained by using two transparent electrodes fixed on the faces of the sheet. The image is projected on the sheet and recorded thereon in the form of local variations in the refractive index. This image can then be examined under a light which does not produce the photo-conductor effect and by using two crossed polarizers in order to display the index variations. Unfortunately such a device has a low resolution because of the migration of photo-electric charges in the thickness of the sheet.

If, however, a holographic recording cell is used which includes a sheet of one of these two materials subjected to a transverse electric field, parallel to a preferred crystal axis of this sheet, then holograms can be recorded in volume with a high resolution and a high sensitivity, both comparable to the characteristics of photographic emulsions.

However, as the crystal is only partially illuminated, illuminated and shaded zones occur and thus a variable local conductivity is created. This causes a partition in the voltage applied to the crystal, leading thereby to a very low field in the middle of the illuminated zone. Thus, if the reference beam does not illuminate the crystal uniformly, the application of the electric field only has a very slight effect on the efficiency of the hologram. Furthermore, the illumination of the crystal, as a function of the position along one axis of the crystal, is a Gaussian signal. The conductivity therefore follows the same variation as the electric field. The index variation in the crystal may thus be likened to a lens which produces a distortion on the conjugate beam which is clearly visible when the conjugate beam, which is the beam obtained after transmission through the electro-optical medium and deflection from a mirror, is compared with the incident beam.

In order to reduce these disadvantages, according to the invention the crystal is illuminated with an incoherent light, illuminating only part of the crystal with the laser beam and giving at one and the same time the advantages of a concentrated beam and of a wide angle beam. That is, it gives a high power density and a good beam geometry as well as an effective application of the electric field without creating a lens effect.

SUMMARY OF THE INVENTION

The object of the present invention is to provide a device for illuminating an electro-optical medium for recording holograms in real time. The device utilizes a source of coherent light, producing, from the coherent light issuing from this source, an object wave intended to illuminate an object, a reference wave, and an interaction medium. This medium receives the object wave emerging from the object and the reference wave with these two waves interfering in this interaction medium in which the spatial modulation of light intensity resulting from the interference fringes induces a spatial modulation of the refractive index. The pattern of strata thus photoinduced diffracted a fraction of the reference wave in the form of a wave front isomorphous with that issuing from the object. This particular medium is subjected to a transverse electric field perpendicular to the direction of the fringes, and additionally includes a second light source which produces a light beam which is not coherent with the light coming from the coherent light source. The second light source illuminates the interaction medium uniformly.

BRIEF DESCRIPTION OF THE DRAWINGS

The invention will be better understood when taken in conjunction with the following description illustrated by the annexed figures in which.

DESCRIPTION OF PREFERRED EMBODIMENTS

Electro-optical media such as crystals of bismuth-silicon oxide ($Bi_{12}SiO_{20}$), lithium niobate ($LiNbO_3$) and potassium niobate ($KNbO_3$) have photo-electric and electro-optical properties which make them suitable for use in real time holography. They can be used to form phase holograms which, when re-read, generate an image beam having properties of phase conjugation with respect to the beam which was used to construct the hologram.

For example, considering the bismuth-silicon oxide or "BSO" crystals, these electro-optical and photo-conducting crystals permit recording by photo-induced variation of index. These materials serve as a backing material for the inscribing of a phase hologram which can be inscribed and erased in real time.

By way of non-limiting example, in the rest of the description, this "BSO" medium will be considered as the interaction medium.

The electro-optical and photo-conducting monocrystals of bismuth-silicon oxide constitute high sensitivity backing materials for the volume recording of diffracting phase structures. The transverse electro-optical configuration used makes it possible to reconstitute images whose spatial resolution is limited by diffraction. These monocrystals, which are available in large sizes with good optical quality, are able to be continuously recycled.

Figure 1:
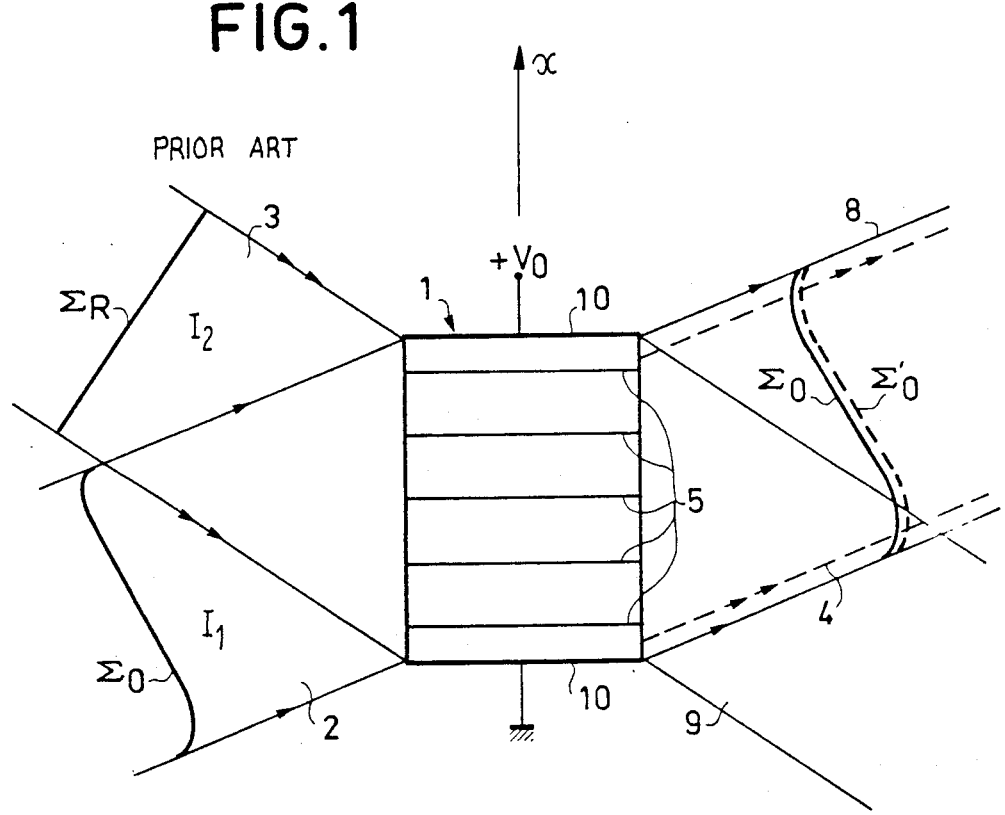
FIGS. 1 and 2 show two devices of the known art.

The electro-optical and photo-conducting bismuth-silicon oxide ($Bi_{12}SiO_{20}$) (BSO) crystals make it possible to record, in volume diffracting phase structures with no spatial resolution limit when an external electric field is applied in the transverse electro-optical configuration. The inscription of an elementary holographic pattern is obtained by interference of two plane waves $\Sigma_1$ and $\Sigma_2$ emitted by a laser. The spatial distribution of light intensity, generated in the volume of the crystal, is given by:

$$I(x) = I_o[1 + m \cos Kx]$$

where $I(x)$ is the light intensity according to axis x of FIG. 1; $I_o = I_1 + I_2$ where $I_1$ is the light intensity of beam $\Sigma_o$ of FIG. 1 and $I_2$ is the light intensity of beam $\Sigma_R$ of FIG. 1

$$m = \frac{\sqrt[2]{I_1 \cdot I_2}}{I_1 + I_2};$$

fringes modulation ratio
$K = 2\pi/\Lambda$: strata steps.

The strata step is related to the angle $2\theta_o$ between the two beams by the following relationship:

$$\Lambda = \lambda_o/2 \sin \theta_o$$

$\lambda_o$: wavelength of inscription wave.

FIG. 1 shows in schematic form the interaction of an object beam and a reference beam in such a non-linear interaction medium. In this medium 1, interference occurs between an object wave 2 with any wave front $\Sigma_o$ and a reference wave 3 with plane wave front $\Sigma_R$. These two waves 2 and 3 are coherent and interfere in the volume of the medium 1. The interference pattern obtained induces a strata pattern 5 in medium 1 with a buildup time constant $\tau$ of the grating, which is a characteristic of the material, and this strata pattern diffracts a fraction of the reference wave 3 along a diffracted wave 4 which is exactly superimposed on the transmitted object wave 8.

This diffracted wave 4 has a wave front $\Sigma'_o$ exactly superimposed on the object wave front $\Sigma_o$ as it leaves the medium 1.

The non-diffracted fraction of the reference wave crosses medium 1 and constitutes the transmitted reference wave 9, maintaining the same plane wave front $\Sigma_R$.

The transfer of energy from the reference wave to the object wave corresponds to a reduction in reference wave intensity after crossing the interaction medium. After the inscription time, equivalent to the time constant $\tau$, corresponding to the saturation recording of the strata pattern from the interference pattern, the transmitted reference wave 9 in the presence of the object wave has undergone a reduction in energy compared to the transmitted reference wave in the absence of the object wave. This reduction corresponds to the gain in the transmitted object wave composed of waves 8 and 4 with interaction, compared to the transmitted object wave 8 in the absence of interaction.

According to the materials used, the inscription time $\tau$ varies from several picoseconds to several tens of milliseconds.

In this FIG. 1 an external field has been applied by connecting a voltage generator $V_o$ to the ends of two electrodes 10 deposited on the surface of the medium 1.

The BSO crystal used in the transverse electrooptical configuration thus constitutes a high spatial resolution backing material for the inscription of holographic patterns and images. One of the advantageous characteristics of this material is that its spatial frequency response (transfer function) can be adjusted with the amplitude of the external field $E_o$. This specific property can be of value for applications involving processing of images in real time.

Certain applications such as interferometry in real time demand a new optical configuration ensuring permanent observation of the diffracted wave. The configuration used, called "four wave mixing", is shown in schematic form in FIG. 2. The non-absorbed part 8 of the plane reference wave 2 is retroflected by the mirror 13. The plane wave 11 constitutes the read wave of the index pattern and diffracts a wave 12 which is the conjugate complex wave of the incident wave 3. A beam separator can then ensure the spatial separation of this conjugate wave 12 diffracted by the crystal, and the incident wave 3.

Figure 2:
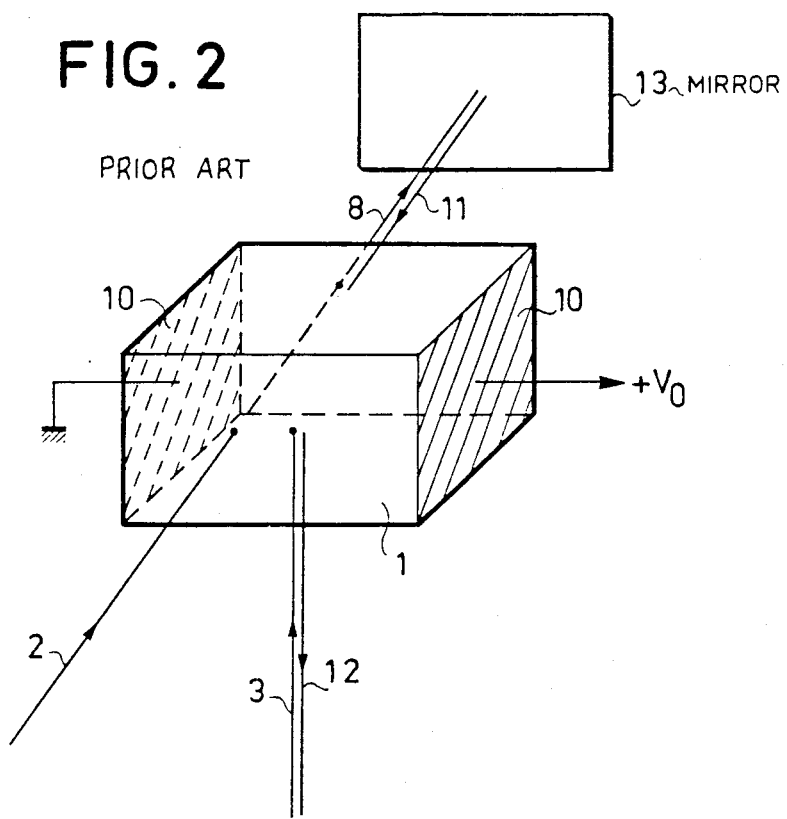

In FIG. 2 a voltage $V_o$ is applied to the ends of two electrodes 10 deposited on the surface of the medium 1.

Thus, one of the parameters which determine the efficiency of these holograms is the electric field applied to the crystal. In addition, it is necessary for the crystal to be uniformly illuminated by the reference beam so that the applied field is effective. This has the disadvantage of deforming the reference beam during its traverse of the crystal, by diffraction at its ends, and thus of reducing the geometric quality of the re-read beam obtained by reflection of the reference beam in the case of "four wave" interferometry.

In addition the power per unit area received by the crystal is reduced by this type of field, which fact increases the time characteristic of the crystal. In the invention it is proposed to illuminate the crystal uniformly by a light which is not coherent with the object and reference laser light beams, for example by a white light, in order to maintain at one and the same time a relatively localized beam and hence a high power density and a good beam geometry, and an effective electric field.

BSO is an electro-optical and photo-conducting material. Therefore the pattern of fringes created by the interference of the object beam and the reference beam generates carriers by photo-conduction, whose density is proportional to the illumination and thus reproduces the modulation of illumination due to the beam interference. These carriers, moved along by the applied electric field, form a pattern of charges which develop a variable internal field. It is this field which is responsible for the formation of a hologram of indices by electro-optical modulation. It can be shown that the larger the field applied to the crystal the greater is the internal field, and the overall result is that the efficiency of the hologram formed is proportional to the square of the applied field.

For simplification, the remainder of the description will refer to illumination by a "laser beam". In fact we are concerned with the illumination of the crystal by the object and reference beams which interfere within the crystal. In general, however, these two beams have inclinations with respect to the crystal which differ to only a very small extent. In the cases where these two beams have directions which can not be merged, this "laser beam" represents the reference beam or pump beam whichever is the more powerful.

The following text will consider by way of example a bismuth-silicon oxide lamina as the interaction medium.

Figure 3:
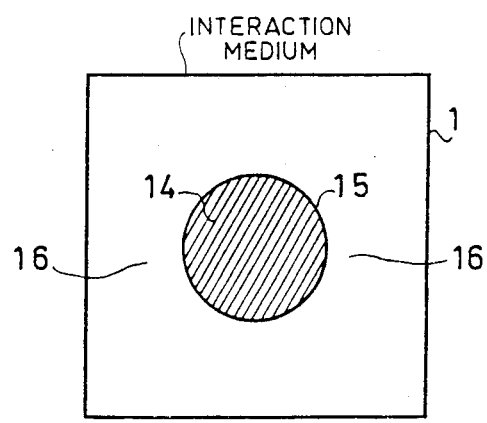
FIG. 3 shows a particular aspect of such devices of the known art.

In FIG. 3 the illumination of the medium 1 by the laser beam is shown. Zone 14 is a zone of high conductivity. Zones 16 are zones of low conductivity. Therefore it appears that there is only a weak field acting within zone 14 and a strong field acting within zones 16. Zone 15 is a zone where a large field gradient exists.

If the crystal is only partially illuminated, illuminated and shaded zones, and thus a variable local conductivity, are created.

The conductivity in the shaded zones is considerably weaker than in the light zones (if the beam is assumed Gaussian) and thus division of the voltage applied to the crystal occurs, leading, in turn, to a very low field in the centre of the illuminated zone. Thus if the reference beam does not illuminate the crystal uniformly, the application of the electric field only changes the effectiveness of the hologram by a very small amount.

Another effect has to be added to this: the illumination of the crystal, as a function of the position along one axis of the crystal, is a Gaussian signal (if the rapid changes due to the interference fringes are ignored). The conductivity thus follows the same variation as the electric field. The index variation in the crystal can thus be likened to a lens with this lens producing a distortion on the conjugate beam. This is a distortion which is clearly visible when the conjugate beam is compared with the incident beam.

If the crystal is illuminated uniformly with a white incoherent light, the photo-conductivity is proportional to the sum of the intensities of the white light and of the laser beam. Although the contrast of the interference fringes is thereby reduced because of the addition of a continuous component, the spatial variations of intensity, and thus of carrier density, may be made very low. Thus the lens effect is to a large extent removed, and it has been possible to observe an improvement in the geometry of the conjugate beam compared to a non-uniform illumination of the crystal by the laser beam, without supplementary incoherent illumination. As a result it is not necessary to illuminate the whole crystal by the laser beam. This gives a better quality of conjugate beam, because there are then no edge effects due to the diffraction of the beam on the crystal edges, and a greater power density. This greater power density leads to lower time constants for the formation and erasing of holograms created in the crystal.

Figure 4:
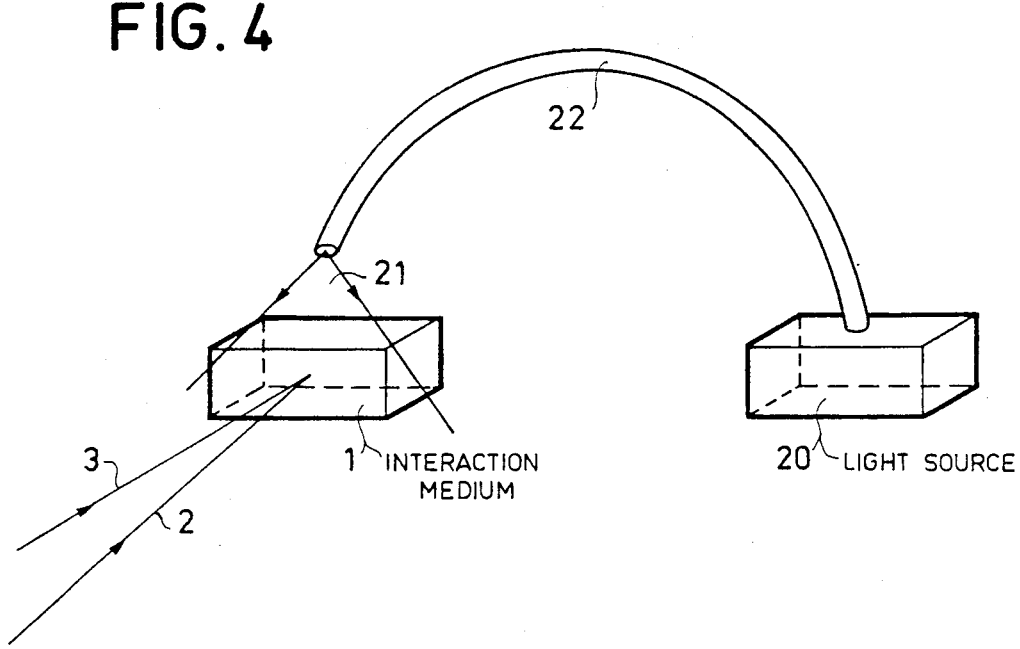
FIG. 4 shows the device of the invention.

In FIG. 4 a possible incoherent illumination configuration is shown. The source 20 is a light source which may be either a source of white light, or a source of coherent light which is not coherent with the laser beam.

In this Figure a bundle of fibers 22 is shown.

In this FIG. 4 it can be seen that it is possible to illuminate the medium on a face other than the one on which the laser beam is incident. It is therefore possible to deposit on this face a reflecting layer or a mask which does not allow the incoherent light to pass at the point where the laser beam passes, in order to avoid a reduction in contrast of the fringes inscribed in the medium.

Figure 5:
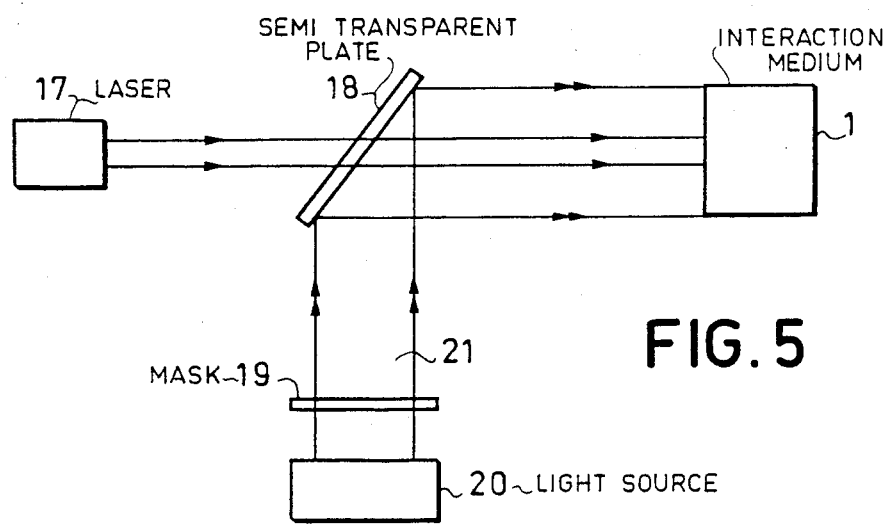
FIG. 5 shows a particular aspect of the device of the invention.

In FIG. 5, in order to obtain the same effect, a mask 19 is provided, which represents, in negative form, the illumination by the laser beam 17 of the face of the medium on which it is incident. That is, mask 19 can be a negative obtained by a photographic process from the illumination of laser beam 17. Then, when mask 19 is illuminated, it transmits a beam (21) complementary to laser beam 17. When beam 21 is combined with beam 17, a uniform illumination is obtained. This mask 19 makes it possible to compensate for the Gaussian illumination of the laser beam 17. Element 18 is a semi-reflecting mirror combining laser beam 17 and 21.

Illuminating the crystal with an incoherent light and only illuminating part of the crystal with the laser beam gives the advantages of a concentrated beam and of a wide angle beam at one and the same time: a high power density and a good beam geometry as well as an efficient application of the electric field without creating a lens effect.

Finally it must be noted that the power of the white light relative to the power of the laser beam may be adjusted so as best to obtain the desired effect.

What is claimed is:

1. A device for illuminating an electro-optical medium for recording holograms in real time, comprising:
    a source of coherent light producing an object wave intended to illuminate an object and a reference wave;
    an interaction medium, receiving the object wave emerging from the object and the reference wave so that these two waves interfere in this interaction medium to produce interference fringes wherein spatial modulation of light intensity results from the interference fringes induces a spatial modulation of the refractive index of the medium inducing a pattern of strata diffracting a fraction of the reference wave in the form of a wave front in phase with the object wave, said medium being subjected to an electric field perpendicular to the direction of the fringes, and said device comprising in addition a second light source which produces a light beam which is not coherent with the light coming from the coherent light source, which illuminates the interaction medium uniformly.

2. A device as claimed in claim 1, in which the interaction medium is in laminar form.

3. A device as claimed in claim 2, in which the interaction medium is a bismuth-silicon lamina.

4. A device as claimed in claim 1, in which the second source is a laser source.

5. A device as claimed in claim 1, in which the second source produces a beam of white light.

6. A device as claimed in claim 1, in which the second source produces a light beam which is routed by means of a bundle of optical fibers.

7. A device as claimed in claim 2, in which the second source produces a light beam incident on a face of the interaction medium different than the face on which the object and reference waves are incident.

8. A device as claimed in claim 7, in which a mask which is opaque to a light beam produced by the second source is deposited on part of the face of the lamina on which said light beam is incident in order to avoid a reduction in contrast of the fringes produced in the medium.

9. A device as claimed in claim 1, in which a mask representing, in complementary form, the illumination of the face of the medium by the object and reference waves is disposed between this second source and the interaction medium.

* * * * *